US008112075B2

(12) United States Patent
Pedersen

(10) Patent No.: US 8,112,075 B2
(45) Date of Patent: Feb. 7, 2012

(54) HARQ-AWARE CQI REPORTING

(75) Inventor: Klaus I. Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 1355 days.

(21) Appl. No.: 11/728,265

(22) Filed: Mar. 23, 2007

(65) Prior Publication Data

US 2007/0238462 A1 Oct. 11, 2007

Related U.S. Application Data

(60) Provisional application No. 60/785,683, filed on Mar. 24, 2006.

(51) Int. Cl.
*H04W 24/00* (2009.01)
(52) U.S. Cl. ........ 455/425; 455/436; 455/561; 370/473; 370/328; 714/748
(58) Field of Classification Search .................. 455/425, 455/561, 436; 370/473; 714/748
See application file for complete search history.

(56) References Cited

U.S. PATENT DOCUMENTS

| 7,894,822 B2* | 2/2011 | Jonsson ..................... 455/452.2 |
| 2005/0003782 A1* | 1/2005 | Wintzell ..................... 455/226.3 |
| 2005/0041618 A1* | 2/2005 | Wei et al. ...................... 370/328 |
| 2005/0100038 A1* | 5/2005 | Pietraski et al. ............... 370/437 |
| 2005/0250540 A1* | 11/2005 | Ishii et al. ...................... 455/561 |
| 2006/0227743 A1* | 10/2006 | Ishimori et al. ................ 370/331 |
| 2008/0144552 A1* | 6/2008 | Johansson et al. ............. 370/310 |

* cited by examiner

*Primary Examiner* — Kamran Afshar
*Assistant Examiner* — Sayed T Zewari

(57) ABSTRACT

The invention provides a method or system where the UE sends the CQI to the base station (Node B) based on whether a HARQ retransmission is expected. For example, if a HARQ retransmission is expected, then the UE can reduce the CQI information to sending less (or no) bits in the uplink. In effect, the UE will automatically stop sending CQIs to the base station (Node B) for time-periods where it is known that HARQ retransmissions will be scheduled. The method or system may include one or more steps or elements for implementing this functionality in the UE.

28 Claims, 2 Drawing Sheets

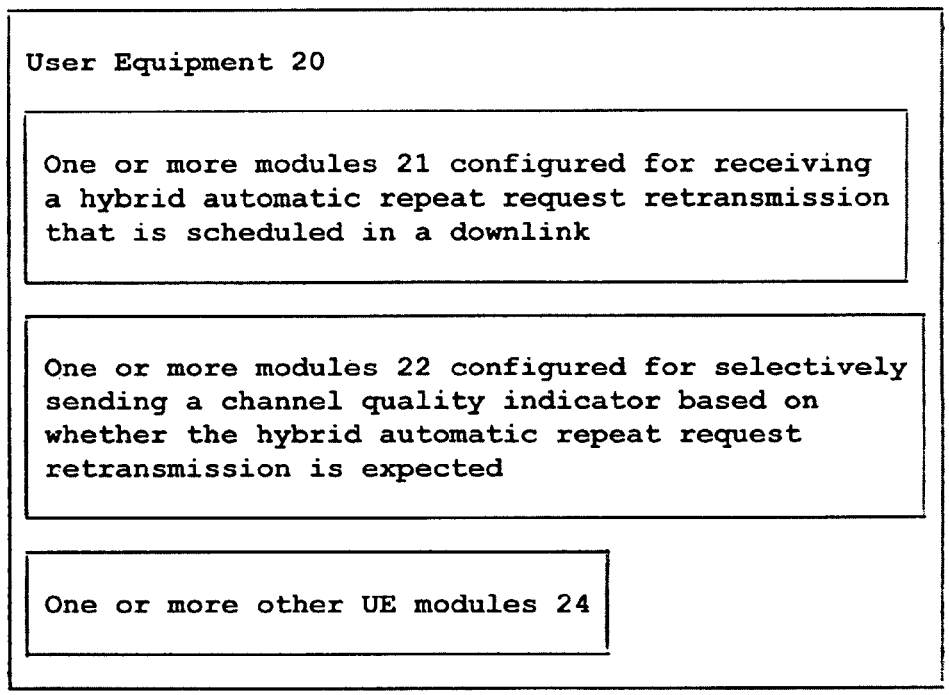
Figure 2: The UE
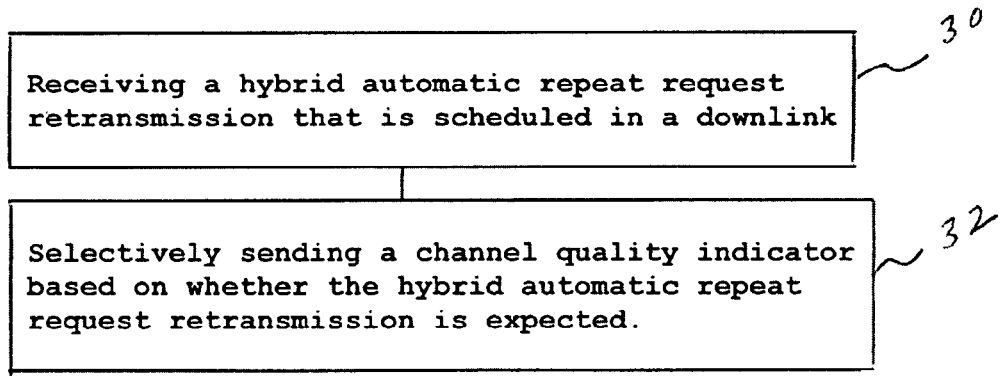
Figure 3: The Basic Method

HARQ-AWARE CQI REPORTING

CROSS REFERENCE TO RELATED APPLICATIONS

This application claims benefit to provisional patent application No. 60/785,683, filed 24 Mar. 2006, which is hereby incorporated by reference in its entirety.

BACKGROUND OF THE INVENTION

1. Field of Invention

The present invention relates to a Universal Mobile Telecommunications System (UMTS) packet network; and more particularly to channel quality indicator (CQI) reporting schemes for Universal Terrestrial Radio Access Network (UTRAN) long term evolution (LTE) in the third generation partnership project (3GPP).

2. Description of Related Art

In the long term evolution (LTE) UTRAN, the architecture is modified so that there no longer will be a radio network controller (RNC). This UTRAN long term evolution is also using orthogonal frequency division multiple access (FDMA) in the downlink, as well as adaptive modulation and coding. The frequency band is divided into resource blocks (RB) in order to allow multiplexing of users in the frequency domain. The latter opens up the possibility for utilization of frequency domain link adaptation (FDLA), the frequency domain link packet scheduling (FDPS), etc. Moreover, the current working assumption for UTRAN long term evolution (LTE) is that the UE should send CQIs in the uplink for different resource blocks (RBs) in order to facilitate the frequency domain link adaptation (FDLA) and the frequency domain link packet scheduling (FDPS) in the downlink. The exact definition of the CQIs and the reporting of those from the UE to the serving cell is currently under discussion in 3GPP. One of the design objectives in 3GPP is to agree on a good trade-off between minimizing the signalling overhead from sending the CQIs in the uplink versus the potential gain from using FDLA and FDPS in the downlink. In particular, there is a need for a method, system or technique for reducing the CQI signalling overhead for the special case where pending Hybrid Automatic Repeat-Request (HARQ) retransmissions are scheduled in the downlink.

In operation, the CQIs per RBs from the users are used by the base station (Node B) to determine (i) which users are going to be scheduled, (ii) which RBs to allocate to the scheduled users, and (iii) which modulation and coding scheme (MCS) to use for the scheduled users (i.e. for FDLA and FDPS). On the other hand, having "complete" CQI information frequently reported from all users and RBs might potentially cause excessive uplink signalling load. In view of this, there is a need for a way to reduce the CQI information significantly for users who are about to be scheduled HARQ retransmissions, since the base station has reduced degrees of freedom for transmitting such, as compared to new transmissions.

SUMMARY OF THE INVENTION

The present invention provides a method, system or technique for reducing the CQI signalling overhead for the special case where pending HARQ retransmissions are scheduled in the downlink.

Moreover, the present invention provides a method, system and technique to reduce the CQI information significantly for users who are about to be scheduled HARQ retransmissions, as the base station has reduced degrees of freedom for transmitting such, as compared to new transmissions.

The basic idea provides for a method and system where the UE selectively sends the CQI based on whether a HARQ retransmission is expected. For example, if a HARQ retransmission is expected, then the UE can reduce the CQI information to sending less (or no) bits in the uplink. In effect, the CQI sent from the UEs will vary depending on whether the HARQ retransmission is expected, and the UE will stop automatically sending CQIs for time-periods where it is known that HARQ retransmissions will be scheduled. The method or system may include one or more steps or elements for implementing this functionality in the UE.

In particular, embodiments according to the present invention may include the UE or some other network element (NE) having a module for sending the CQI to the base station (Node B) based on whether a HARQ retransmission is expected. The module may include one or more steps for determining when the HARQ retransmissions are scheduled.

The present invention may also take the form of a chipset for the UE or NE for carrying out the aforementioned functionality, as well as a computer program product with a program code, which program code is stored on a machine readable carrier, for carrying out the steps of the method according to the present invention. The method may also feature implementing the step of the method via a computer program running in a processor, controller or other suitable module in the UE or NE in the network.

The scope of the invention is intended to include implementation in a UMTS packet network such as that shown in FIGS. 1a, 1b; UTRAN long term evolution (LTE) in the third generation partnership project (3GPP), including the specifications set forth in 3GPP TR 25.814 as they relate to the "Evolved UTRA and UTRAN;" as well as other suitable networks either now known or later developed in the future.

Moreover, the scope of the invention is intended to include implementation in networks using both adaptive and non-adaptive HARQ retransmission schemes, including HARQ retransmission schemes both now known and later developed in the future.

One advantage of the present invention is that the uplink signaling overhead from sending CQIs is reduced.

BRIEF DESCRIPTION OF THE DRAWING

The drawing includes the following Figures, which are not necessarily drawn to scale:

FIG. 2 shows User Equipment (UE) according to some embodiments of the present invention.

FIG. 3 shows the steps of the method according to some embodiments of the present invention.

BEST MODE OF THE INVENTION

The Basic Invention

Figure 1A:
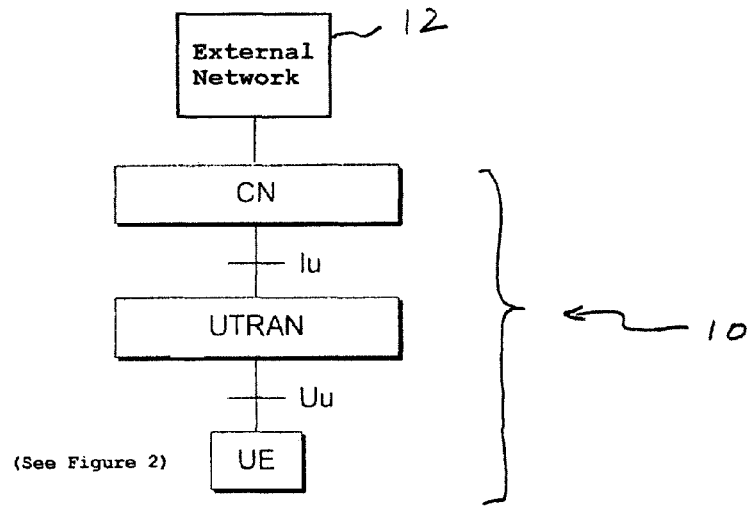
FIGS. 1a and 1b show diagrams of the basic architecture of a Universal Mobile Telecommunications System (UMTS) packet network according to some embodiments of the present invention.
Figure 1B:
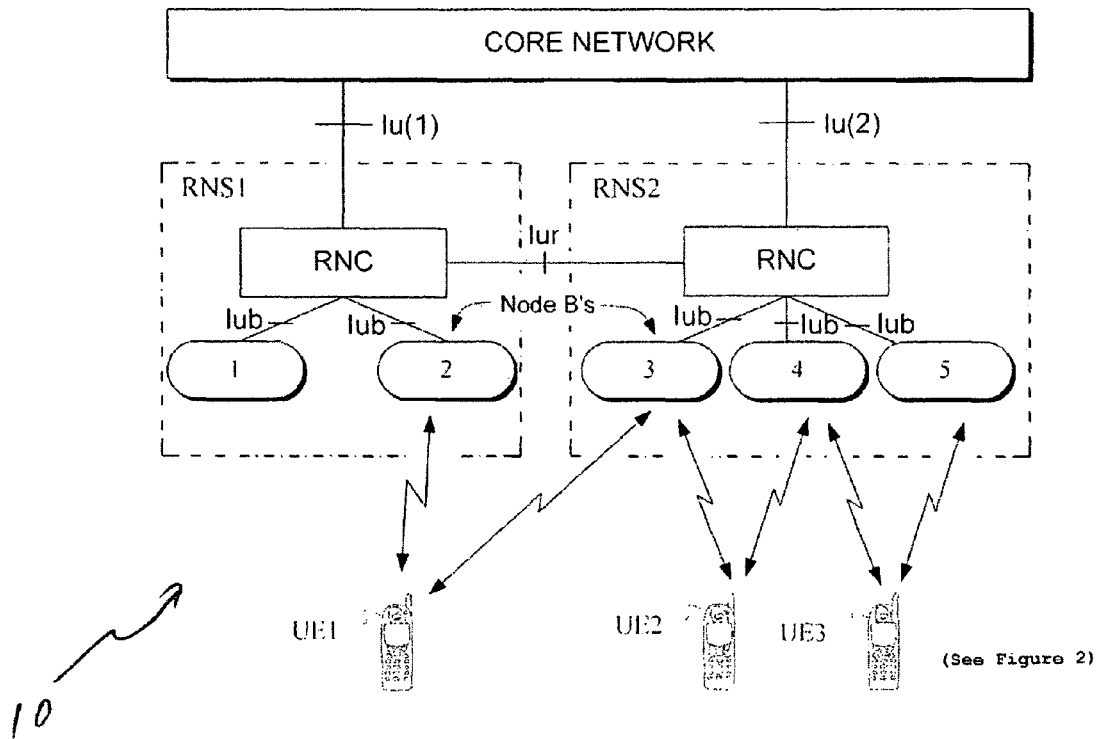

FIGS. 1a and 1b show diagrams of the Universal Mobile Telecommunications System (UMTS) packet network generally indicated as 10 that is coupled to an external network 12. The UMTS 10 is a wireless system designed to provide higher data rates and enhanced service to subscribers and is standardized by the 3GPP, including the specifications set forth in 3GPP TR 25.814 as they relate to the "Evolved UTRA and UTRAN."

In FIG. 1a, the architecture of the UMTS packet network 10 includes the major elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. The CN is coupled to the external network, which may include the Internet, a Public Land Mobile Network (PLMN), a Public Switched Telephone Network (PSTN), an Integrated Services Digital Network (ISDN), etc., which can exchange information to and from the UE.

FIG. 1b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 1a. A given UE may be in radio contact with multiple Node Bs even if one or more of the Node Bs are connected to different RNCs. For instance, a UE1 in FIG. 1b may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC.

According to the present invention, one or more of the UEs in FIGS. 1a and 1b is configured to receive a hybrid automatic repeat request retransmission that is scheduled in a downlink and selectively send a channel quality indicator based on whether the hybrid automatic repeat request retransmission is expected, as best shown in FIG. 2. Moreover, FIG. 3 shows the basic steps 30, 32 according to some embodiments of the present invention.

In the case of a synchronous HARQ, it is known by both the base station (Node B) and the UE when a pending HARQ retransmission will be transmitted in the downlink. For the special case where HARQ retransmission are limited to always being sent on the same RBs as the original transmission, there is no need for CQIs at the base station. Hence, according to the present invention the UE should stop automatically sending CQIs to the base station (Node B) for time-periods where it is known that HARQ retransmissions will be scheduled. Cases where HARQ retransmissions are limited to be transmitted on the same RBs as the original transmission are called non-adaptive HARQ in 3GPP (see 3GPP TR 25.814, which is hereby incorporated by reference in its entirety).

It is also mentioned in 3GPP TR 25.814 that adaptive HARQ is an option. The adaptive HARQ refers to the case where the base station packet scheduler has the flexibility to schedule the pending HARQ retransmissions on RBs different from the RBs used during the original transmission. For this particular case, the CQI feedback from the UE can be optimized so the UE only signals the index of the N best RBs (RBs with highest SINR), assuming that N RBs were used during the original transmission.

Thus, according to some embodiments of the present invention, the CQI sent from the UEs will vary depending on whether a HARQ retransmission is expected. If a HARQ retransmission is expected, the CQI information can be reduced to sending less (or no) bits in the uplink. Using this idea significantly reduces the CQI feedback during periods with HARQ retransmissions, as compared to blindly signalling full CQI information as usually needed for optimal scheduling and MCS for new transmissions.

The present invention should be implemented at the UE. Moreover, the base station may be suitable adapted to cooperate with the UE functionality.

FIG. 2: User Equipment (UE)

The present invention may be implemented as follows:

FIG. 2 shows, by way of example, a UE 20 having one or more modules 21 configured for receiving a hybrid automatic repeat request (HARQ) retransmission that is scheduled in a downlink from a base station (see FIG. 1b, Node B), and having one or more modules 22 for selectively sending the CQI to the base station, such as Node B 1-5 in FIG. 1b, based on whether the HARQ retransmission is expected. According to the present invention, the UE 20 will not automatically send CQIs to the base station (Node B) for time-periods where it is known that HARQ retransmissions will be scheduled. In operation, the CQI sent from the UE 20 will vary depending on whether the HARQ retransmission is expected. If the HARQ retransmission is expected, the CQI information can be reduced to sending less (or no) bits in the uplink. Using this idea significantly reduces the CQI feedback during periods with HARQ retransmissions, as compared to blindly signaling full CQI information as usually needed for optimal scheduling and MCS for new transmissions as was done in the prior art UEs. The modules 21 and/or 22 may include one or more steps for determining when the HARQ retransmissions are scheduled.

By way of example, and consistent with that described herein, the functionality of the modules 21 and/or 22 may be implemented using hardware, software, firmware, or a combination thereof, although the scope of the invention is not intended to be limited to any particular embodiment thereof. In a typical software implementation, the module 22 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the module 22 being stand alone modules, as shown, or in the combination with other circuitry for implementing another module in the UE, such as for example modules 21 or 24.

The UE includes other modules 24 (or circuits, or devices) that do not form part of the underlying invention per se. The functionality of the other modules, circuits, devices that do not form part of the underlying invention are known in the art and are not described in detail herein. For example, the other modules 24 may include modules that form part of a typical mobile telephone, node, point, terminal or device, such as a UMTS subscriber identity module (USIM), control processor module, input/output module, display module, keyboard module, and mobile equipment (ME) module, which are known in the art and not described herein.

The Network Element (NE)

Embodiments of the present invention may include a network element (NE) having a suitable module either for sending the CQI to the base station (Node B) based on whether a HARQ retransmission is expected, consistent with that described herein, or for cooperating with the module 22 in the UE 20 of FIG. 2 for implementing the present invention in a UMTS like that shown in FIG. 1a or 1b.

The Chip or Chipset

The present invention may also take the form of a chip or chipset for a UE in such a UMTS or other suitable network, which may include a number of integrated circuits designed to perform one or more related functions, such as that shown in FIG. 2. For example, one chip or chipset may provide the basic functions of a modem while another provides the CPU functions for a computer. Newer chipsets generally include functions provided by two or more older chipsets. In some cases, older chipsets that required two or more physical chips can be replaced with a chipset on one chip. The term "chipset" is also intended to include the core functionality of a motherboard in such a UE, node, point, terminal or device.

Advantages

One advantage of the present invention is that it can be used to reduce (optimize) the CQI overhead for cases where synchronous HARQ is applied.

One disadvantage may include the fact that the different modes of CQI reporting (for normal transmissions and HARQ retransmissions) might make the system more complex and therefore more difficult to test and implement.

Acronyms

3GPP: Third generation partnership project
MCS: Modulation and coding scheme
CQI: Channel quality indicator
RB: Resource Block
LTE: Long Term Evolution
FDLA: Frequency Domain Link Adaptation
FDPS: Frequency Domain Packet Scheduling

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A method comprising:
    receiving a hybrid automatic repeat request retransmission that is scheduled in a downlink; and
    selectively sending a channel quality indicator based on whether the hybrid automatic repeat request retransmission is expected,
    wherein for the case of an adaptive hybrid automatic repeat request retransmission where a base station packet scheduler has the flexibility to schedule pending hybrid automatic repeat request retransmissions on different resource blocks than the resource blocks used during an original transmission, channel quality indicator feedback from user equipment can be optimized so the user equipment only signals an index of the N best resource blocks.

2. A method according to claim 1, wherein in the case of a synchronous hybrid automatic repeat request retransmission both a base station and a user terminal know when a pending hybrid automatic repeat request retransmission will be transmitted in the downlink.

3. A method according to claim 1, wherein for the case where the hybrid automatic repeat request retransmission is sent on the same resource blocks as an original transmission, there is no need for the channel quality indicator at a base station.

4. A method according to claim 1, wherein user equipment automatically stops sending the channel quality indicator for time periods where it is known that hybrid automatic repeat request retransmissions will be scheduled.

5. A method according to claim 1, wherein the N best resource blocks have the highest signal-to-noise ratio.

6. A system comprising:
    a network element having
    one or more modules configured to receive a hybrid automatic repeat request retransmission that is scheduled in a downlink; and
    one or more modules configured to selectively send a channel quality indicator based on whether the hybrid automatic repeat request retransmission is expected,
    wherein for the case of an adaptive hybrid automatic repeat request retransmission where a base station packet scheduler has the flexibility to schedule pending hybrid automatic repeat request retransmissions on different resource blocks than the resource blocks used during an original transmission, channel quality indicator feedback from user equipment can be optimized so the user equipment only signals an index of the N best resource blocks.

7. A system according to claim 6, wherein in the case of a synchronous hybrid automatic repeat request retransmission both a base station and a user terminal know when a pending hybrid automatic repeat request retransmission will be transmitted in the downlink.

8. A system according to claim 6, wherein for the case where the hybrid automatic repeat request retransmission is sent on the same resource blocks as an original transmission, there is no need for the channel quality indicator at a base station.

9. A system according to claim 6, wherein user equipment automatically stops sending the channel quality indicator for time periods where it is known that hybrid automatic repeat request retransmissions will be scheduled.

10. A system according to claim 6, wherein the N best resource blocks have the highest signal-to-noise ratio.

11. User equipment comprising:
    one or more modules configured to receive a hybrid automatic repeat request retransmission that is scheduled in a downlink; and
    one or more modules configured to selectively send a channel quality indicator based on whether the hybrid automatic repeat request retransmission is expected,
    wherein for the case of an adaptive hybrid automatic repeat request retransmission where a base station packet scheduler has the flexibility to schedule pending hybrid automatic repeat request retransmissions on different resource blocks than the resource blocks used during an original transmission, channel quality indicator feedback from the user equipment can be optimized so the user equipment only signals an index of the N best resource blocks.

12. User equipment according to claim 11, wherein in the case of a synchronous hybrid automatic repeat request retransmission both a base station and the user terminal know when a pending hybrid automatic repeat request retransmission will be transmitted in the downlink.

13. User equipment according to claim 11, wherein for the case where the hybrid automatic repeat request retransmission is sent on the same resource blocks as an original transmission, there is no need for the channel quality indicator at a base station.

14. User equipment according to claim 11, wherein the user equipment automatically stops sending the channel quality indicator for time periods where it is known that hybrid automatic repeat request retransmissions will be scheduled.

15. User equipment according to claim 11, wherein the N best resource blocks have the highest signal-to-noise ratio.

16. A network element comprising:
one or more modules configured to receive a hybrid automatic repeat request retransmission that is scheduled in a downlink; and
one or more modules configured to receive a channel quality indicator that is selectively sent based on whether the hybrid automatic repeat request retransmission is expected by user equipment,
wherein for the case of an adaptive hybrid automatic repeat request retransmission where a base station packet scheduler has the flexibility to schedule pending hybrid automatic repeat request retransmissions on different resource blocks than the resource blocks used during an original transmission, channel quality indicator feedback from user equipment can be optimized so the user equipment only signals an index of the N best resource blocks.

17. A network element according to claim 16, wherein in the case of a synchronous hybrid automatic repeat request retransmission both a base station and the user terminal know when a pending hybrid automatic repeat request retransmission will be transmitted in the downlink.

18. A network element according to claim 16, wherein for the case where the hybrid automatic repeat request retransmission is sent on the same resource blocks as an original transmission, there is no need for the channel quality indicator at a base station.

19. A network element according to claim 16, wherein user equipment automatically stops sending the channel quality indicator for time periods where it is known that hybrid automatic repeat request retransmissions will be scheduled.

20. A network element according to claim 16, wherein the N best resource blocks have the highest signal-to-noise ratio.

21. A chipset comprising:
one or more chipset modules configured to receive a hybrid automatic repeat request retransmission that is scheduled in a downlink; and
one or more chipset modules configured to selectively send a channel quality indicator based on whether the hybrid automatic repeat request retransmission is expected,
wherein for the case of an adaptive hybrid automatic repeat request retransmission where a base station packet scheduler has the flexibility to schedule pending hybrid automatic repeat request retransmissions on different resource blocks than the resource blocks used during an original transmission, channel quality indicator feedback from the user equipment can be optimized so the user equipment only signals an index of the N best resource blocks.

22. A chipset according to claim 21, wherein in the case of a synchronous hybrid automatic repeat request retransmission both a base station and the user terminal know when a pending hybrid automatic repeat request retransmission will be transmitted in the downlink.

23. A chipset according to claim 21, wherein for the case where the hybrid automatic repeat request retransmission is sent on the same resource blocks as an original transmission, there is no need for the channel quality indicator at a base station.

24. A chipset according to claim 21, wherein user equipment automatically stops sending the channel quality indicator for time periods where it is known that hybrid automatic repeat request retransmissions will be scheduled.

25. A chipset according to claim 21, wherein the N best resource blocks have the highest signal-to-noise ratio.

26. An apparatus comprising:
at least one processor and at least one non-transitory computer readable medium stored with computer program code, the at least one memory and the computer program code configured to, with the at least one processor, cause the apparatus at least to:
receive a hybrid automatic repeat request retransmission that is scheduled in a downlink, and selectively send a channel quality indicator based on whether the hybrid automatic repeat request retransmission is expected,
wherein for the case of an adaptive hybrid automatic repeat request retransmission where a base station packet scheduler has the flexibility to schedule pending hybrid automatic reseat request retransmissions on different resource blocks than the resource blocks used during an original transmission, channel quality indicator feedback from the user equipment can be optimized so the user equipment only signals an index of the N best resource blocks.

27. A method according to claim 1, wherein the method further comprises implementing the step of the method via a computer program running in a processor, controller or other suitable module in user equipment.

28. Apparatus comprising:
means for receiving a hybrid automatic repeat request retransmission that is scheduled in a downlink; and
means for selectively sending a channel quality indicator based on whether the hybrid automatic repeat request retransmission is expected,
wherein for the case of an adaptive hybrid automatic repeat request retransmission where a base station packet scheduler has the flexibility to schedule pending hybrid automatic repeat request retransmissions on different resource blocks than the resource blocks used during an original transmission channel quality indicator feedback from the user equipment can be optimized so the user equipment only signals an index of the N best resource blocks.

* * * * *